United States Patent [19]

Amano et al.

[11] Patent Number: 4,724,445

[45] Date of Patent: Feb. 9, 1988

[54] THERMAL PRINTER ERASURE SYSTEM

[75] Inventors: Toshiaki Amano; Ikuo Hibino, both of Iwate, Japan

[73] Assignee: Alps Electric Co., Ltd., Japan

[21] Appl. No.: 858,609

[22] Filed: May 1, 1986

[30] Foreign Application Priority Data

May 1, 1985 [JP] Japan .................................. 60-92228

[51] Int. Cl.$^4$ .......................... G01D 15/10; B41J 3/10

[52] U.S. Cl. ................................ 346/76 PH; 400/120; 400/696; 400/697.1

[58] Field of Search .................... 346/76 PH; 400/120, 400/240.1, 696, 697.1

[56] References Cited

U.S. PATENT DOCUMENTS 4,396,308 8/1983 Applegate et al. ................. 400/696
4,545,693 10/1985 Bartlett et al. ...................... 400/120

*Primary Examiner*—E. A. Goldberg
*Assistant Examiner*—Gerald E. Preston
*Attorney, Agent, or Firm*—Guy W. Shoup

[57] ABSTRACT

A thermal transfer printer erases previously recorded characters by applying heating energy of higher surface density than that used to originally transfer thermally fusible material onto a recording sheet. A thermal transfer tape made of a polyester film and a layer of thermally fusible material is interposed between a thermal head of the printer and the recording sheet at the position to be erased. The thermally fusible material has a higher adhering affinity for the polyester film than for the recording sheet at the higher heating energy level and thus fusible material previously recorded on the recording sheet adheres to the tape at the higher energy level. When the tape is pulled away from the recording sheet, the previously recorded character adheres to the tape and is pulled away with it.

7 Claims, 9 Drawing Figures

THERMAL PRINTER ERASURE SYSTEM

This application is related to application Ser. No. 872,213, filed on June 6, 1986.

BACKGROUND OF THE INVENTION

This invention relates to a thermal printer, and more particularly to a thermal printer capable of erasing characters or symbols recorded by thermal transfer printing.

Thermal printers have been developed wherein a thermal transfer medium or thermal ribbon has a thermally fusible material thereon. The thermal ribbon is positioned between a recording paper and a thermal head, and a plurality of heat generating elements provided on the thermal head are heated to melt the thermally fusible material and thereby transfer it onto the recording paper or record medium. Compared to other types of printers such as, for example, wire matrix printers (impact printers), these thermal transfer printers promise improved performance because they do not make noise and they can be produced at a lower manufacturing cost.

Recently, these thermal printers are being used in electronic typewriters and the like. In such typewriters, it is essential to have a correcting function to erase recorded characters or symbols. However, conventional thermal printers do not have any effective correcting means for erasing characters or symbols after the characters are recorded by transferring onto a record paper. One solution to the correcting problem is provided by thermal printers of a type wherein a pigment of the same color as the record paper, is painted over characters or symbols recorded on the record paper. These printers use an erasing ribbon provided independently of a thermal transfer medium in order to erase erroneously typed characters or symbols. However, such correction requires a change-over mechanism for changing over between the thermal transfer medium and the erase ribbon, resulting in complication and increased size of the mechanism. Additionally, high quality recording is not possible when re-recording on the pigment because of the unevenness of the surface where the pigment is painted over the first printed characters

SUMMARY OF THE INVENTION

It is an object of the present invention to provide a thermal printer which allows, by virtue of its simple construction, effective erasing of characters recorded by thermal transfer printing.

According to the present invention, a thermal printer using a thermally fusible material on a thermal transfer medium interposed between a record paper and a thermal head has means for transferring the fusible material onto the record paper by applying a first printing energy through the thermal head to effect recording, and means for applying a second printing energy through the thermal head, higher than the first printing energy, for transferring the fusible material back to the transfer medium to thereby remove or erase a character or symbol from the record paper.

DETAILED DESCRIPTION OF THE PREFERRED EMBODIMENT

Figure 1:
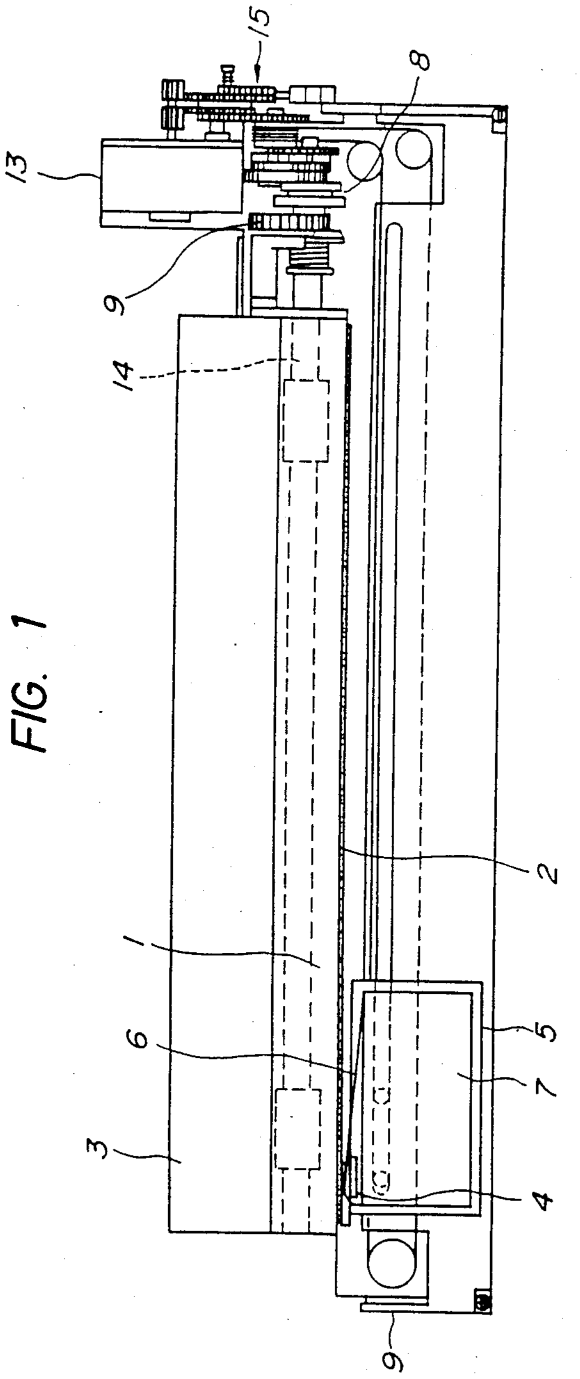
FIG. 1 is a plan view of a thermal printer according to the present invention.

An embodiment of the present invention will now be described with reference to the accompanying drawings. FIG. 1 is a plan view of a thermal printer according to the present invention. Referring to FIG. 1, reference numeral 1 denotes a platen around which record paper (not shown) is wrapped, 2 a platen rubber member which is mounted at a front position or printing position of the platen 1, and 3 a paper guide for guiding the record paper wrapped around the platen 1. Reference numeral 4 designates a thermal head disposed in opposing relationship to the platen rubber member 2 and having a plurality of heat generating elements thereon, 5 a carriage on which the thermal head 4 is carried, 6 a printing tape serving as a thermal transfer medium having thereon a thermally fusible material which is to be transferred onto the record paper, and 7 a tape cassette in which the printing tape 6 is contained. The tape cassette 7 is removably mounted on the carriage 5. The printing tape 6 consits of two layers, a polyester film 10, and a thermally fusible material 11 to be transferred. When recording, the thermal head 4 is pressed against a rear face of the polyester film 10 while the record paper 12 is closely contacting a front face of the thermally fusible material 11.

Reference numeral 13 denotes a stepping motor serving as a driving source for moving the carriage 5 along the platen rubber member 2 and for rotating a paper feed shaft 14 to effect feeding of the record paper, 15 denotes a gearing for transmitting a rotating force from the stepping motor 13, and 8 a clutch mechanism for selectively transmitting the rotational force of the stepping motor 13 either to move the carriage 5 or to feed the record paper. The stepping motor 13 is further connected to transmit its rotational force to a cam 9 to move the thermal head 4 toward or away from the record paper by suitably controlling the cam 9.

Figure 2:
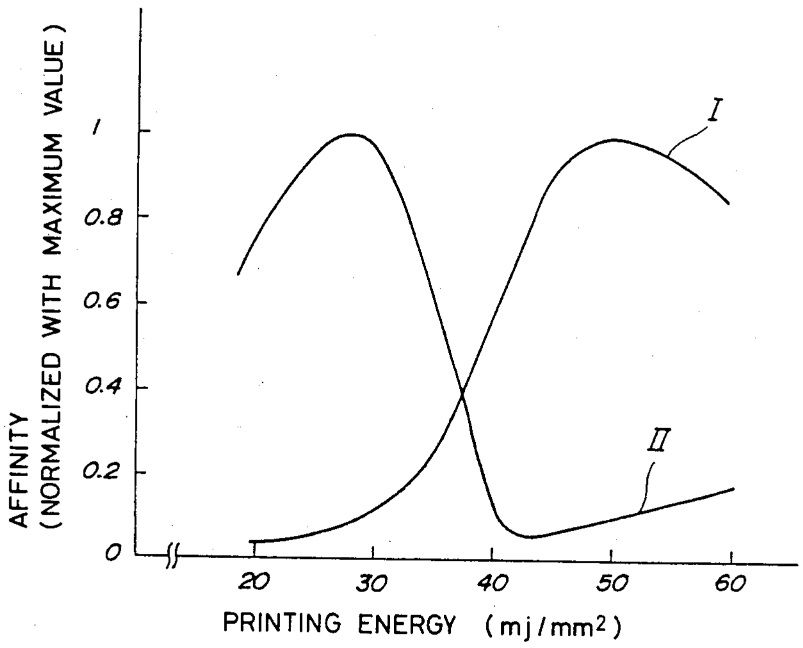
FIG. 2 is a graph for illustrating the relationship between the affinity of a thermally fusible material and the applied printing energy.

The thermally fusible material 11 of the printing tape 6 has a transfer characteristic which is illustrated by the graph in FIG. 2. Referring to FIG. 2, a first curve I shows the affinity (the adhering force between two different substances) between the thermally fusible material 11 and the polyester film 10 varying relative to the printing energy (heat energy) applied to the thermally fusible material 11 while the second curve II illustrates the affinity between the thermally fusible material 11 and the record paper 12 in relation to the printing energy (heat energy) applied to the thermally fusible material 11.

In particular, it is seen that the affinity between the thermally fusible material 11 and the polyester film 10 (curve I) is very low (a condition wherein the thermally fusible material may readily be exfoliated from the polyester material) at a printing energy of about 20 to 35 $mj/mm^2$ and is high (the adhering force between the thermally fusible material and the polyester film is strong) at a printing energy of about 45 to 55 $mj/mm^2$. Meanwhile, the affinity between the thermally fusible material 11 and the record paper 12 (curve II) has a maximum value at about 20 to 35 $mj/mm^2$ and its minimum value at about 45 to 55 $mj/mm^2$. Accordingly, the affinity of the thermally fusible material 11 to the polyester film 10 is inverse to the affinity thereof with the record paper 12 within a particular range of the printing energy (heat energy).

Figure 3:
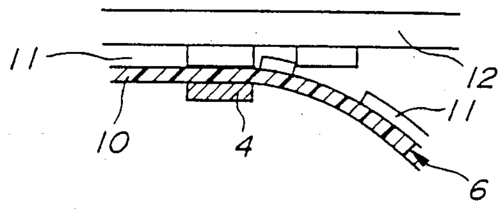
FIG. 3 is an illustrative view showing transfer of a fusible material for recording.

First, the character recording operation using the printing tape 6 which has the thermally fusible material 11 thereon will be described wih reference to FIG. 3. The thermal head 4 is pressed toward the platen rubber member 2 by an action of the cam 9 with the printing tape 6 and the record paper 12 interposed therebetween. Then, by applying a printing energy of about 25 to 30 $mj/mm^2$ to the thermal head, the thermally fusible material 11 is selectively melted to transfer a desired character, symbol or the like onto the record paper. In this instance, since the record paper 12 has a much higher affinity for the thermally fusible material 11 than the base film 10 as described above, the fusible material adheres to the paper and recording of a high quality can be attained.

Figure 4A:
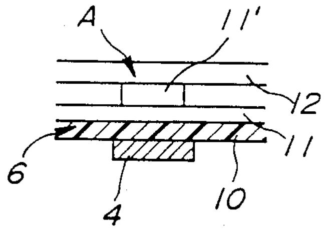
FIGS. 4(*a*), 4(*b*) and 4(*c*) are similar views showing different stages of correction of a recorded character or symbol.
Figure 4B:
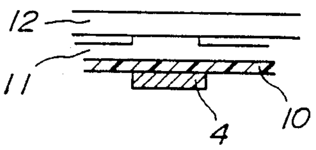
Figure 4C:
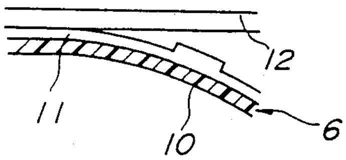

Now, a correcting operation using the same printing tape 6 will be described with reference to FIGS. 4(*a*), 4(*b*) and 4(*c*). When a character A composed of a thermally fusible material 11 that has been printed on the record paper 12 is to be erased, the thermal head 4 is moved to be positioned in opposing relationship to the character A with the printing tape 6 interposed therebetween, and a printing energy of about 45 to 55 $mj/mm^2$ is applied to the thermal head 4 (refer to FIG. 4(*a*)). As a result, the thermally fusible material 11 of the printing tape 6 and the thermally fusible material 11' of the printed character A melt and become integrated with each other (refer to FIG. 4(*b*)). The printing tape 6 is pulled away from the record paper 12. At this instant, since the record paper 12 has a much lower affinity with the thermally fusible material 11 than the polyester film 10 as described above, the printed character A is removed from the record paper, leaving the position on the record paper available for another character or the like if desired.

It is to be noted that when a character or symbol 14 is to be removed, the thermal head must be moved to a predetermined position opposing the character or symbol to be erased. Normally, when correction is to take place, the thermal head is spaced away from the record paper (head up) at a position A (see FIG. 5) and it needs to be returned to the predetermined position B, and after it has returned to the predetermined position, it is pressed toward the record paper (head down at a position B) to lift off the thermally fusible material of the character 14 from the record paper.

Figure 6:
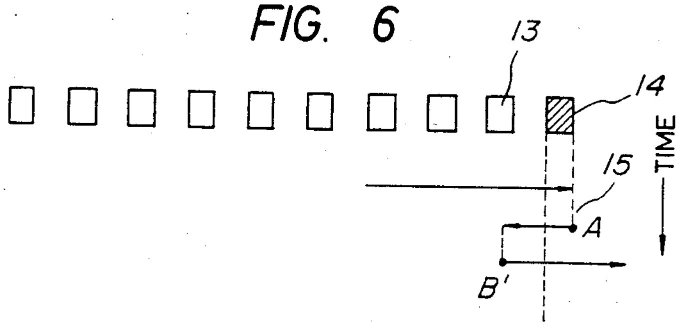
FIGS. 6 and 7 are similar views illustrating different movements of a thermal head when a symbol printed in error is to be erased.

Alternatively when characters are recorded spaced apart, i.e. 23, 24 of FIG. 6, the thermal head may be returned to a position B' (see FIG. 6) farther than the predetermined position of the character or symbol to be erased before the character or symbol 24 is lifted off. In this case, it is possible to energize the thermal head to preheat it while it is moving to the farther position B'.

Figure 5:
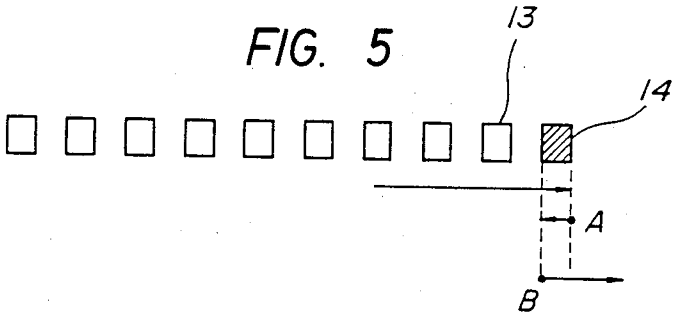
FIG. 5 is a diagrammatic representation illustrating movements of a thermal head when a symbol printed in error is to be erased.
Figure 7:
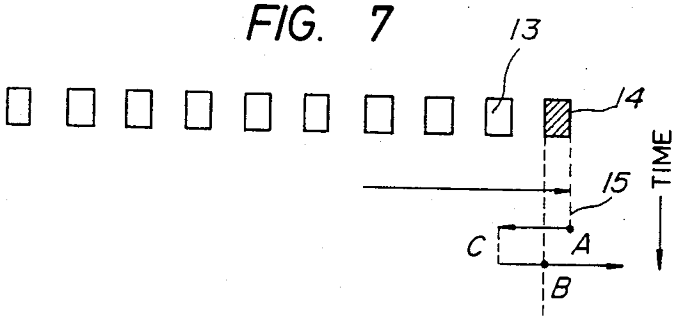

Correction can be made thirdly with the thermal head first moved away from the record paper and returned to a position C, the thermal head being preheated on the way and then it is moved to the position B at which point it is again pressed toward the record paper to effect lifting off of the character or symbol. (Head up and head down movement is indicated by the dots of FIGS. 5–7.)

It is to be noted that while description has been given above of an embodiment of a thermal printer wherein a tape cassette containing a printing tape therein is mounted on a carriage so as to allow transfer recording as the carriage is moved, the present invention can be applied also to a thermal line printer wherein a thermal head has heat generating elements for printing a full line thereon while a thermal transfer medium is interposed between the record paper and the heat generating elements for printing the line.

As apparent from the foregoing description, according to the present invention, a thermal printer prints by using a thermally fusible material on a thermal transfer medium interposed between record paper and a thermal head which is transferred onto the record paper by applying a first printing energy generated by the thermal head to effect recording and the same printer removes undesired portions of fusible material adhered to the record paper by applying a second printing energy higher than the first printing energy to thereby erase a character or symbol printed on the record paper. Thus, the present invention presents a remarkable effect that transfer recording and correction can be arbitrarily attained by suitably controlling the printing energy applied from the thermal head, without the necessity of providing any complicated mechanism for correcting characters, symbols and so on recorded by thermal transfer.

What is claimed is:

1. A thermal printer wherein a thermally fusible material on a thermal transfer medium is interposed between a record paper and a thermal head, comprising:

means for generating a first printing energy from said thermal head to effect recording;

correcting means for generating a second printing energy higher than said first printing energy from said thermal head to thereby remove a character or symbol composed of thermally fusible material previously formed on said record paper; and means for moving said thermal head in a first direction to a position farther than position opposing the character to be removed, and then at the farthest position, pressing said thermal head toward the record paper.

2. A thermal printer wherein a thermally fusible material on a thermal transfer medium is interposed between a record paper and a thermal head, comprising:

means for generating a first printing energy from said thermal head to effect recording;

correcting means for generating a second printing energy higher than said first printing energy from said thermal head to thereby remove a character or symbol composed of thermally fusible material previously formed on said record paper; and means for moving the thermal head and preheating said thermal head before said thermal head reaches the position of the character to be removed.

3. A thermal printer according to claim 2, comprising means for moving, said thermal head to a position opposing to the character or symbol to be erased while said thermal head is held spaced away from the record paper, and for pressing said thermal head toward the record paper when said thermal head reaches the position of the character to be erased.

4. A thermal printer according to claim 2 wherein said first printing energy is less than 35 $mj/mm^2$.

5. A thermal printer according to claim 2 wherein said first printing energy is in the range 25 to 30 $mj/mm^2$.

6. A thermal printer according to claim 2 wherein said second printing energy is in the range 45 to 55 $mj/mm^2$.

7. A thermal printer according to claim 2 comprising a printing tape having a polyester film layer and a layer of thermally fusible material.

* * * * *